UNITED STATES PATENT OFFICE.

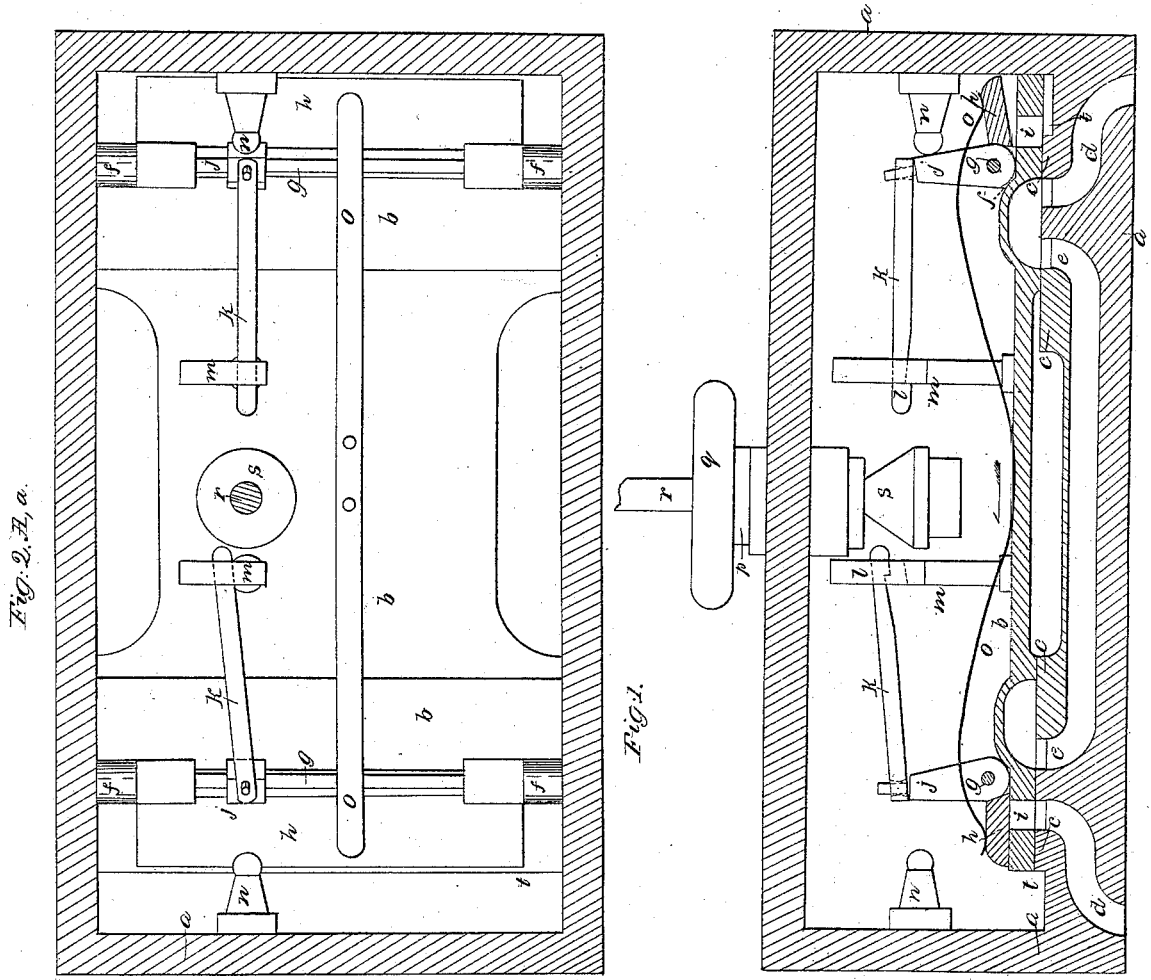

ADAM S. CAMERON, OF NEW YORK, N. Y.

CUT-OFF VALVE FOR STEAM-ENGINES.

Specification of Letters Patent No. 22,935, dated February 15, 1859.

*To all whom it may concern:*

Be it known that I, ADAM SCOTT CAMERON, of the city, county, and State of New York, have invented certain new and useful Improvements in Cut-Off Valves of Steam-Engines; and I do hereby declare that the following is a full, clear, and exact description thereof, reference being had to the accompanying drawings, making part of this specification, in which—

Figure 1, is a longitudinal vertical section of the steam chest of a steam engine with my improved cut-off valves; and Fig. 2 a horizontal section thereof taken at the line A a, of Fig. 1.

The same letters indicate like parts in all the figures.

The object of the first part of my said invention is to relieve slide cut-off valves from the pressure of the steam at the time of opening the steam ports and thereby save much of the power heretofore expended in opening such valves; and this part of my said invention consists in combining with the slide valve which opens the steam ports, trip valves which are hinged to the slide valve to open and close the steam passages in the said slide valve and so operated by the sliding of the steam valve as to open the steam passages and close them suddenly at any required period, to cut off the steam, the seat of the steam slide valve being so formed that at the periods of lifting the hinged valves the steam passages in the said slide valve shall be beyond the valve seat that the steam in the steam chest may at the time have access to the under face of the hinged valves to relieve them of the pressure of steam which would otherwise have to be overcome in opening them. And the object of the second part of my said invention is also to regulate the period of cutting off the steam in such valves at any desired part of the stroke of the piston; and consists in combining with the said trip hinged valves and the slide valve a cone or equivalent device, made adjustable by a governor or other means to vary the periods when the mechanism which liberates the trip valves shall come in contact with it to effect the tripping of the valves and cutting off the steam. And the object of the last part of my said invention is to adjust the period of closing the two trip hinged valves relatively to each other, and to the strokes of the piston; and this part of my invention consists in mounting the cone, or equivalent, on which the mechanism of the hinged valves acts to effect the disengagement on an eccentric arbor passing through to the outside of the steam chest so that by turning the said arbor the eccentricity of the said cone will admit of adjusting its periphery to the tripping mechanism of the two valves as may be desired and while the engine is in motion.

In the accompanying drawings (*a*) represents the steam chest of a steam engine, with the usual slide valve (*b*) to be operated in the usual manner, and adapted to slide on the valve seat (*c*) formed as usual with two steam ports (*d, d*) and with exhaust ports (*e*). The upper part of the slide valve is provided with two sets of ears (*f, f*) to receive the hinge or fulcrum pins (*g, g*) of two hinged valves (*h, h*) the faces of which are adapted to close the two steam passages (*i, i*) of the slide valve. By the turning of the valves (*h, h*) on their hinge or fulcrum pins the said steam passages can be opened or closed, and that these operations may be performed, each valve has an arm (*j*) to the upper end of which is hinged a rod (*k*) having a hook (*l*) which when the valve is opened hooks onto a standard (*m*). The rod extends some distance beyond the hook, so that when, by the movements of the slide valve, the extreme end strikes against the face of a cone or equivalent wedge stop or cam (to be presently described) the rod shall be unhooked that the valve may suddenly close to cut off the steam. And when the slide valve approaches the end of its opposite movement the arm (*j*) of the valve strikes against a fixed stop (*n*) (which may be made adjustable) by which the hinged valve is opened and the rod hooked on to keep it open until the required period of cut off. Both valves (*h, h*) are in like manner provided with an arm, a hook rod and appendages; and to insure the rapid closing of these valves when unhooked, if their weight be not sufficient for this purpose, a spring may be employed and which may be applied in the manner represented at (*o*). This is a flat spring attached to the upper surface of the slide valve with the ends extending over and bent to act on top of the two hinged valves as represented.

To the top of the steam chest is fitted a tube (*p*) with a ground or other suitable steam tight joint; and the end of this, outside the steam chest, is provided with a hand wheel (*q*) by which it can be turned. This tube is eccentric and to its bore is fitted a cylindrical rod (*r*) adapted to slide therein steam tight. The outer end of this rod may be connected with a governor or any other adjustable apparatus; and its lower end inside the steam chest carries a cone (*s*) placed between the inner ends of the two hook rods, so that by moving it in or out the periods in which the said hook rods shall be brought in contact with it by the sliding of the valve will be varied, and as this is varied so will be the periods of closing the hinged valves and cutting off the steam. And so by turning the tube (*p*) the bore of which is eccentric, as stated, the cone will be made to approach the one or the other of the hook rods, so that by this means the engineer can readily and with the utmost accuracy, adjust the periods of the relative closing of the two valves.

The seat (*c*) of the slide valve (*b*) projects but a short distance outside of the two steam ports, as represented at (*t, t*) that is to say, that part of the seat should be only a little greater in length than the length of the steam passages (*i*) so that in the movements of the valve the moment one of the steam passages (*i*) passes off from its corresponding port (*d*) it shall pass beyond the valve seat that the steam in the chest may get under the hinge valve to balance the pressure before the hook rod strikes against its stop to lift the hinge valve and hook on the rod.

The parts being thus constructed it will be seen that when the slide valve is moved by the usual connection of the engine, in the direction of the arrow, and one of the steam passages (*i*) opens its port, the steam passing through the steam passage (*i*) and steam port (*d*) will impel the piston of the engine, and when the piston has made the required portion of its stroke, the hook rod (*k*) strikes against the cone (*s*) by which it is unhooked. This liberates the hinged valve (*h*) which instantly closes stopping the steam passage (*i*) and hence cutting off the steam that it may act expansively. And on the return movement the steam passage (*i*) first passes off from the steam port (*d*) and then begins to pass beyond the valve seat at (*t*) admitting the steam to the under face of the hinged valve which is thus balanced, and then the opposite end of the hook rod (*k*) strikes against the stop (*n*), lifting the valve and hooking on the rod to keep the valve open until the period for cutting off the steam returns; the period being determined by the position of the cone, whether regulated by the governor, by the hand of the engineer, or by any other suitable means. The same movements take place alternately with the two valves.

It will be obvious that a wedge or cam may be substituted for the cone, as the means for effecting the unhooking of the rods to trip or liberate the cut off valves; and so with the other parts, other devices may be substituted to perform the same offices or functions, so long as the principle or mode of operation which distinguishes my invention from all other things before known, remains the same.

What I claim as my invention, and desire to secure by Letters Patent, is—

1. The employment of the trip hinged valves with their hook rods and appendages for operating them, or the equivalents thereof, substantially as described, in combination with the slide valve, substantially as described, for cutting off the steam in steam engines as described.

2. I also claim in combination with the slide and the trip hinged valve operated substantially as described, the so forming the seat of the slide valve, relatively to the steam passages in the slide valve, substantially as described, as to admit the steam to the under face of the hinged valve and balance the pressure before they are opened, as set forth.

3. I also claim in combination with the slide and trip hinge valves combined and operating, substantially as herein described, the employment of the adjustable cone or its equivalent, substantially as described, to regulate the period of cutting off the steam as described.

4. And I also claim the cone, or its equivalent, in combination with the eccentric tube, or its equivalent, substantially as described, as a means of adjusting the relative periods of closing the two valves, as set forth.

ADAM S. CAMERON.

Witnesses:
 WM. H. BISHOP,
 ANDREW DE LACY.